(12) United States Patent
Watson, Jr. et al.

(10) Patent No.: US 6,909,459 B2
(45) Date of Patent: Jun. 21, 2005

(54) METHOD OF AND APPARATUS FOR EXTENDING SIGNAL RANGES OF DIGITAL IMAGES

(75) Inventors: Robert M. Watson, Jr., San Leandro, CA (US); John J. Kang, Alameda, CA (US)

(73) Assignee: Alpha Innotech Corporation, San Leandro, CA (US)

( * ) Notice: Subject to any disclaimer, the term of this patent is extended or adjusted under 35 U.S.C. 154(b) by 0 days.

(21) Appl. No.: 10/465,013

(22) Filed: Jun. 18, 2003

(65) Prior Publication Data

US 2004/0036775 A1 Feb. 26, 2004

Related U.S. Application Data

(60) Provisional application No. 60/404,752, filed on Aug. 21, 2002.

(51) Int. Cl.[7] .................................................. H04N 5/235
(52) U.S. Cl. ..................... 348/229.1; 348/255; 382/133; 382/274
(58) Field of Search .............................. 378/98.9, 98.11, 378/98.12; 348/61, 207.99, 207.1, 207.2, 222.1, 229.1, 230.1, 241–243, 250, 254, 255, 678, 683; 382/100, 128, 133, 270, 272, 274

(56) References Cited

U.S. PATENT DOCUMENTS

| | | | | |
|---|---|---|---|---|
| 4,945,250 A | * | 7/1990 | Bowen et al. ........... | 250/461.1 |
| 5,309,243 A | * | 5/1994 | Tsai ....................... | 348/221.1 |
| 5,777,756 A | * | 7/1998 | Hidari ..................... | 358/479 |
| 5,778,044 A | * | 7/1998 | Bruijns .................... | 378/98.12 |
| 6,005,638 A | * | 12/1999 | Blair et al. ................. | 348/607 |
| 6,040,858 A | | 3/2000 | Ikeda ....................... | 348/242 |
| 6,061,092 A | * | 5/2000 | Bakhle et al. ............. | 348/243 |
| 6,100,937 A | * | 8/2000 | DiMeo ..................... | 348/621 |
| 6,285,798 B1 | * | 9/2001 | Lee ........................ | 382/266 |
| 6,535,624 B1 | * | 3/2003 | Taylor, Jr. ................ | 382/128 |
| 6,563,536 B1 | * | 5/2003 | Rashkovskiy et al. ...... | 348/243 |
| 6,687,400 B1 | * | 2/2004 | Szeliski ..................... | 382/168 |
| 6,734,905 B2 | * | 5/2004 | Fossum et al. ............. | 348/300 |
| 2001/0008419 A1 | * | 7/2001 | Sano et al. ................. | 348/222 |
| 2003/0147497 A1 | * | 8/2003 | Avinash ..................... | 378/98.9 |

FOREIGN PATENT DOCUMENTS

| | | | |
|---|---|---|---|
| EP | 0 863 663 A2 | 9/1998 | ............ H04N/3/15 |
| EP | 0 863 663 A3 | 10/1999 | ............ H04N/3/15 |
| EP | 0 991 128 A2 | 4/2000 | ......... H01L/27/148 |
| JP | 04044476 A * | 6/1990 | ............ H04N/5/52 |
| JP | 05122616 A * | 5/1993 | ............ H04N/5/335 |
| JP | 06086155 A * | 3/1994 | ......... H04N/5/243 |
| JP | 920196 A2 * | 6/1999 | ......... H04N/5/235 |
| WO | WO 00/57633 | 9/2000 | ............ H04N/3/14 |
| WO | WO 00/79326 A1 | 12/2000 | ........... G02B/27/10 |
| WO | WO 01/16884 A1 | 3/2001 | ............. G06T/1/00 |

OTHER PUBLICATIONS

Philippe Fischer & Greg P. Kochanski, "*Optimal Addition of Images for Detection and Photometry*", Feb. 1994, vol. 107, No. 2.

* cited by examiner

*Primary Examiner*—Wendy R. Garber
*Assistant Examiner*—Jason Whipkey
(74) *Attorney, Agent, or Firm*—Haverstock & Owens LLP

(57) ABSTRACT

The invention is a method and apparatus to extend the signal range of a digital image beyond the nominal sensor or data format range. The method and apparatus automatically acquires a scaled series of source data, applies noise reduction to the source data, and constructs a scaled composite with usable signal ranges greater than that of the individual data sources. Applied to digital images, the invention permits presentation and analysis of all signals from a subject in a single composite or an image resulting from the method and apparatus of the present invention. The present invention overcomes two defects in prior art systems: increased noise in the resultant composite image arising from rescaling of component images and dependence on evaluating image content to determine image scaling. Because this invention can be automated, it can be applied in numerous fields requiring high throughput.

40 Claims, 6 Drawing Sheets

METHOD OF AND APPARATUS FOR EXTENDING SIGNAL RANGES OF DIGITAL IMAGES

RELATED APPLICATION(S)

This Patent Application claims priority under 35 U.S.C. §119(e) of the co-pending U.S. Provisional Patent Application, Ser. No. 60/404,752, filed Aug. 21, 2002, and entitled "METHOD AND APPARATUS TO EXTEND SIGNAL RANGE." The Provisional Patent Application, Ser. No. 60/404,752, filed Aug. 21, 2002, and entitled "METHOD AND APPARATUS TO EXTEND SIGNAL RANGE" is also hereby incorporated by reference in its entirety.

FIELD OF THE INVENTION

The present invention relates generally to the field of digital imaging applications. More particularly, the present invention relates to the field of extending the useful optical density (OD) range in digital imaging samples.

BACKGROUND OF THE INVENTION

In many digital imaging applications, light from a subject can be represented in an image. Despite improvements in sensor technology, the light signal or brightness range of naturally occurring and constructed subjects often exceeds the nominal output range of instruments available to detect photons. For this reason, numerous methods have been described in the art of photography to extend the dynamic or signal range of images. Typically, these approaches involve methods for combining data from different images into a composite image based on methods to approximate the relationship between the initial images. Composite images that represent data with extended dynamic range could provide significant advantages for the presentation and quantitative study of the relationships between elements within such a high dynamic range subject. Such composites facilitate rapid comparison of disparate intensity objects by visual inspection. Furthermore, such composites permit more compact storage of information than the aggregated source data.

The study of genomics, proteomics and like fields apply technologies to analyze all genes from an organism on a common reference basis. Often, these technologies employ fluorescent or radioisotopic tags to provide high sensitivity and dynamic range. Genome-wide analysis of yeast indicates that 80% of genes generate 10 or fewer mRNA molecules per cell. Moreover, genes of critical interest that regulate cellular activity often produce rare mRNAs. In the area of gene expression, the products (messenger RNA (mRNA) or protein) of a highly expressed gene may exceed those of another gene by a million-fold within a given cell. This range of gene expression extends beyond the typical 65,536-fold (16 bit) maximum capabilities of high performance scientific detectors. In addition, the nominal output data of the sensor includes some amount of noise that reduces the useful signal range. For scientific imaging, the usable signal above the noise level provides a more relevant measure of performance than nominal output data range.

Extended Dynamic Range

The desire to extend dynamic range in images is not unique to scientific measurement and numerous methods have been described to address this issue in the art of photography. These approaches have several shortcomings relative to processing and analyzing scientific images. U.S. Pat. No. 6,040,858 to Ikeda (hereinafter referred to as "Ikeda") describes two general approaches to image combination for extending dynamic range. While these methods may generate visually pleasing images, they do not address the demands of scientific imaging. In both approaches, a properly exposed image that does not have saturated pixels is used as the "standard image." The standard image is combined with a rescaled version of a nonstandard image in one method. Below a brightness threshold, values from the standard image are used; above this threshold, values are computed from the under-exposed image. To accommodate the extended dynamic range, high values are compressed to fit within the standard output data representation. This method introduces a non-linear relationship between output data from the sensor system and the light emitted by the subject. Specifically, the brightest objects have disproportionately lower output values that would be expected from the less bright objects. Losing the linear relationship between object brightness and output data value limits this method's application to scientific quantification.

The other prior art method described by Ikeda combines a standard image with a different non-standard image. In this approach, the non-standard image contributes a higher output noise value than present in the standard image. To mitigate this noise value, a threshold is set above the noise value and the combined image is constructed from values above this threshold. Thus, the potential for extended dynamic range is limited by the scaling of noise in the composite image.

FIG. 1 diagrams the problem of increased output noise level in the resultant composite image resulting from component image rescaling in prior art approaches. FIG. 1 shows the signal data bits as open boxes and noise data bits as shaded boxes. Specifically, Source Data A 10 and Source Data B 20 are two corresponding pixels in 14-bit output data format that will be combined into one Composite Data 16-bit 30 output data format pixel. The data in these images can be scaled in proportion to the System Gain 40 used to capture each image. However, if noise accounts for the lowest 4 bits within each source pixel the resulting image will still only have about 10 bits of signal above noise 50. Under these conditions, there is little or no significant gain in dynamic range over the initial noise. Applying a threshold as described by Ikeda improves the signal to noise ratio in the thresholded data 60 (2 bits of noise in 12 rather than 4 in 14), but does not substantively improve the quantifiable signal range over the Source Data A 10.

Sensor Attributes

Many types of photon detecting sensors are known in the art, these include: charge-coupled device (CCD), complementary metal oxide semiconductor (CMOS), amorphous silicon, passive and active pixel sensors, photomultiplier tubes (PMT), microchannel plates, vidicon tubes, and photodiodes. Sensors can be classified as point sensors and field imaging (two dimensional or array) sensors depending on whether they have one or a two dimensional array of photon detecting elements. Both photon detecting elements and the data they produce may be called pixels for "picture elements." It is well known in the art that point sensors can be scanned to produce two dimensional images. Thus, these various sensors can be discussed together.

The sensor absorbs light signals from the subject, transforms them into electrons and the electrons are converted into output values or digital numbers (DN). A field sensor images the spatial locations on the subject into pixels, and assigns each pixel a DN for total signal received. The maximum number of electrons that a pixel can hold limits the signal range of the sensor. In turn, this limit corresponds to a certain number of signal values it can assign each pixel (0 to 4096 for a 12-bit sensor). The saturation point ($S_{Sat}$) is the limit beyond which the sensor can record no more signal (4096 for a 12-bit sensor). The minimum signal ($S_{Min}$) is the minimum signal required for the sensor to record a signal value (1 for a 12-bit sensor).

A number of factors affect the relationship between the amount of light received by a sensor and its DN output. It is well known that various sensors differ in their Quantum Efficiency (QE). QE varies with respect to wavelength and is the number of electrons produced per number of photons received with respect to a theoretical ideal. To convert the electrons to a DN, sensors employ analog to digital converters (ADC). The relationship between input voltage levels and digital number output may also be called gain. Photon counting sensors may also be characterized by their "linear response range." Within this range, the signal detected for each pixel (S) is directly proportional to the light from the subject received by the sensor. $S_{Sat}$ represents the maximum limit for the linear response range.

After reaching $S_{Sat}$ for a certain pixel, an ordinary sensor is not only unable to record more signal, but is also unable to contain the excess electrons. Therefore any additional signal received at that pixel will result in electrons overflowing to unsaturated neighboring pixels. This creates falsely high apparent signals for those neighboring pixels. When observed with 2-dimensional CCDs and other field imaging sensors, this phenomenon is commonly called "blooming." The specific shape of blooming reflects the path of excess electron overflow based on sensor architecture rather than the subject. Since the overflow signal contaminates the target signal, data is lost when blooming occurs.

Various methods are known to overcome the limitation of signal overflow. Some sensors are equipped with 'anti-blooming' technology that prevents electrons flowing into neighboring pixels even at signal levels well beyond saturation. FIG. 2 compares signal ranges for an ordinary sensor with an anti-blooming sensor. Here, the signal from an ordinary sensor 70 shows that the point of signal saturation ($S_{sat}$) 75 and the point of signal blooming or overflow ($S_{bloom}$) 75 are the same. Therefore, any signal not in the recorded signal 72 overflows or "blooms" into neighboring pixels, showing here as blooming 74. An anti-blooming sensor 80 signal has separate saturation ($S_{sat}$) 81 and blooming ($S_{bloom}$) 83 points such that the portion of the signal that is not part of the recorded signal 82 does not overflow into neighboring pixels. The additional signal 84 goes unrecorded, neighboring unsaturated pixels remain unaffected, and the unsaturated pixels in the image will contain reliable signal values that are proportional to the light emitted by the subject. Eventually, anti-blooming sensors also reach a signal level where electrons overflow to adjacent pixels and blooming 86 occurs beyond the blooming point ($S_{Bloom}$) 83, but this can be several times $S_{sat}$ 81.

Technology Trends

Two additional factors deserve note. First is the exponential increase in available performance from computers with more RAM, faster processors, fixed and removable disk storage. This trend reduces barriers to applying image processing solutions that may be computationally intensive to increasingly high resolution images. Generally, methods that can be implemented as software solutions can provide for improved, lower cost support of multiple apparatus architectures.

Second is the growing market for low cost, high resolution consumer-oriented digital cameras. This trend results in CCD and CMOS detectors with many more numerous, but smaller pixels that have reduced electron well capacity. This decreased well capacity coincides with decreases in effective dynamic range and signal to noise ratio for consumer grade sensors. By combining appropriate dynamic range extension methods with consumer grade sensors, these inexpensive sensors may become more useful for a broader range of applications including scientific applications.

SUMMARY OF THE INVENTION

The invention is a method and apparatus to extend the signal range of a digital image beyond the nominal sensor or data format range. The method and apparatus automatically acquires a scaled series of source data, applies noise reduction to the source data, and constructs a scaled composite with usable signal ranges greater than that of the individual data sources. Applied to digital images, the invention permits presentation and analysis of all signals from a subject in a single composite or an image resulting from the method and apparatus of the present invention.

In one aspect of the present invention, a method of extending a signal range of a digital image comprises duplicating the digital image such that a plurality of source images are formed, each of the source images including a predetermined number of the duplicated digital images, scaling each of the plurality of source images, wherein the scaling is based upon a gain value assigned to each of the plurality of source images, reducing a noise component in each of the plurality of source images, such that a plurality of noise reduced images are formed corresponding to each of the plurality of source images and adding the plurality of noise reduced images. The method further comprises receiving the digital image in a sensor and sending the digital image to a computer and outputting the sum of the plurality of noise reduced images to an output device.

In the method of this aspect, each of the plurality of noise reduced images includes a single noise reduced image. The gain value for each of the plurality of source images is $2^x$, such that the highest gain value will not exceed $2^x$ where x is an integer less than or equal to 10, and each successive gain value will have a value of $2^{x-1}$. The predetermined number of duplicated digital images in each of the plurality of sources images is determined by $2^x$, wherein x is equal to 0 for the source image having the highest gain value, and each successive source image will have a number of duplicate digital images according to $2^{x+1}$. A user can set the highest gain value and the number of the plurality of source images, and when reducing the noise component in each of the plurality of source images, the computer averages each of the plurality of source images.

In another aspect of the present invention, an apparatus for extending a signal range of a digital image comprises means for duplicating the digital image such that a plurality of source images are formed, each of the source images including a predetermined number of the duplicated digital images, means for scaling each of the plurality of source images, wherein the scaling means are based upon a gain value assigned to each of the plurality of source images, means for reducing a noise component in each of the plurality of source images, such that a plurality of noise reduced images are formed corresponding to each of the plurality of source images and means for adding the plurality of noise reduced images. The apparatus further comprises means for receiving the digital image in a sensor and means for sending the digital image to a computer and means for outputting the sum of the plurality of noise reduced images to an output device.

In the apparatus of this aspect, each of the plurality of noise reduced images includes a single noise reduced image. The gain value for each of the plurality of source images is $2^x$, such that the highest gain value will not exceed $2^x$ where x is an integer less than or equal to 10, and each successive gain value Will have a value of $2^{x-1}$. The predetermined number of duplicated digital images in each of the plurality of sources images is determined by $2^x$, wherein x is equal to 0 for the source image having the highest gain value, and each successive source image will have a number of duplicate digital images according to $2^{x+1}$. A user can set the highest gain value and the number of the plurality of source images. The reducing means reduces the noise component in each of the plurality of source images, the computer averages each of the plurality of source images.

In another aspect of the present invention, an apparatus for extending a signal range of a digital image comprises a sensor configured for receiving the digital image form a subject, a computer coupled to the sensor, wherein the computer receives the digital image from the sensor and extends the signal range of the digital image and an output device coupled to the computer for receiving the digital image having the extended signal range. The apparatus further comprises a sensor assembly including the sensor, a sensor cooling device and a sensor control device, the sensor assembly similarly configured to receive the digital image form the subject, a sensor filter and a lens coupled between the subject and the sensor configured to filter and focus the digital image before the digital image is received in the sensor, a transilluminator including an illumination source and a light filter, wherein the transilluminator is configured to provide illumination to the subject, a subject holder movably coupled to the transilluminator, the subject holder configured to move the digital image and a data acquisition enclosure coupled to the computer, the data acquisition enclosure including the transilluminator, the subject, the sensor filter, the lens and the sensor assembly.

The computer includes means for duplicating the digital image such that a plurality of source images are formed, each of the source images including a predetermined number of the duplicated digital images, means for scaling each of the plurality of source images, wherein the scaling means are based upon a gain value assigned to each of the plurality of source images, means for reducing a noise component in each of the plurality of source images, such that a plurality of noise reduced images are formed corresponding to each of the plurality of source images and means for adding the plurality of noise reduced images.

The apparatus also comprises means for receiving the digital image in a sensor and means for sending the digital image to a computer and means for outputting the sum of the plurality of noise reduced images to an output device. Also, each of the plurality of noise reduced images includes a single noise reduced image. The gain value for each of the plurality of source images is $2^x$, such that the highest gain value will not exceed $2^x$ where x is an integer less than or equal to 10, and each successive gain value will have a value of $2^{x-1}$. The predetermined number of duplicated digital images in each of the plurality of sources images is determined by $2^x$, wherein x is equal to 0 for the source image having the highest gain value, and each successive source image will have a number of duplicate digital images according to $2^{x+1}$. A user can set the highest gain value and the number of the plurality of source images. When the reducing means reduces the noise component in each of the plurality of source images, the computer averages each of the plurality of source images. The sensor is a charge coupled device or a complementary metal oxide semiconductor. The output device is a video monitor or a printer.

In another aspect of the present invention, an article of manufacture comprises a computer readable medium bearing program code embodied therein for use with a computer, the program code includes means for duplicating a digital image such that a plurality of source images are formed, each of the source images including a predetermined number of the duplicated digital images, means for scaling each of the plurality of source images, wherein the scaling means are based upon a gain value assigned to each of the plurality of source images, means for reducing a noise component in each of the plurality of source images, such that a plurality of noise reduced images are formed corresponding to each of the plurality of source images and means for adding the plurality of noise reduced images. The article of manufacture further comprises means for receiving the digital image in a sensor and means for sending the digital image to a computer and further comprising means for outputting the sum of the plurality of noise reduced images to an output device.

In the article of manufacture of this aspect, each of the plurality of noise reduced images includes a single noise reduced image. The gain value for each of the plurality of source images is $2^x$, such that the highest gain value will not exceed $2^x$ where x is an integer less than or equal to 10, and each successive gain value will have a value of $2^{x-1}$. The predetermined number of duplicated digital images in each of the plurality of sources images is determined by $2^x$, wherein x is equal to 0 for the source image having the highest gain value, and each successive source image will have a number of duplicate digital images according to $2^{x+1}$. A user can set the highest gain value and the number of the plurality of source images. When the reducing means reduces the noise component in each of the plurality of source images, the computer averages each of the plurality of source images.

In yet another aspect of the present invention, an apparatus for extending a signal range of a digital image comprises a storage media for storing a computer application, a processing unit coupled to the storage media and a user interface coupled to the processing unit such that a user can duplicate the digital image to form a plurality of source images, scale each of the plurality of source images, reduce a noise component in each of the plurality of source images and add the plurality of source images.

Numerous variations and teachings relevant to the present invention will be obvious to one of average skill in the art. For example, some computational,operations should be performed under conditions such as extended data format to prevent data overflow, underflow, or round-off error. The precise order of numerical and other operations may be modified to improve performance or speed as suits the computing implementation environment. The method may be implemented as software, firmware, or hardware as suits the practitioner. It will also be obvious that the invention may be applied equally to single point, two-dimensional image data, subsets and series of two-dimensional image data.

DETAILED DESCRIPTION OF THE PREFERRED EMBODIMENT

Figure 1:
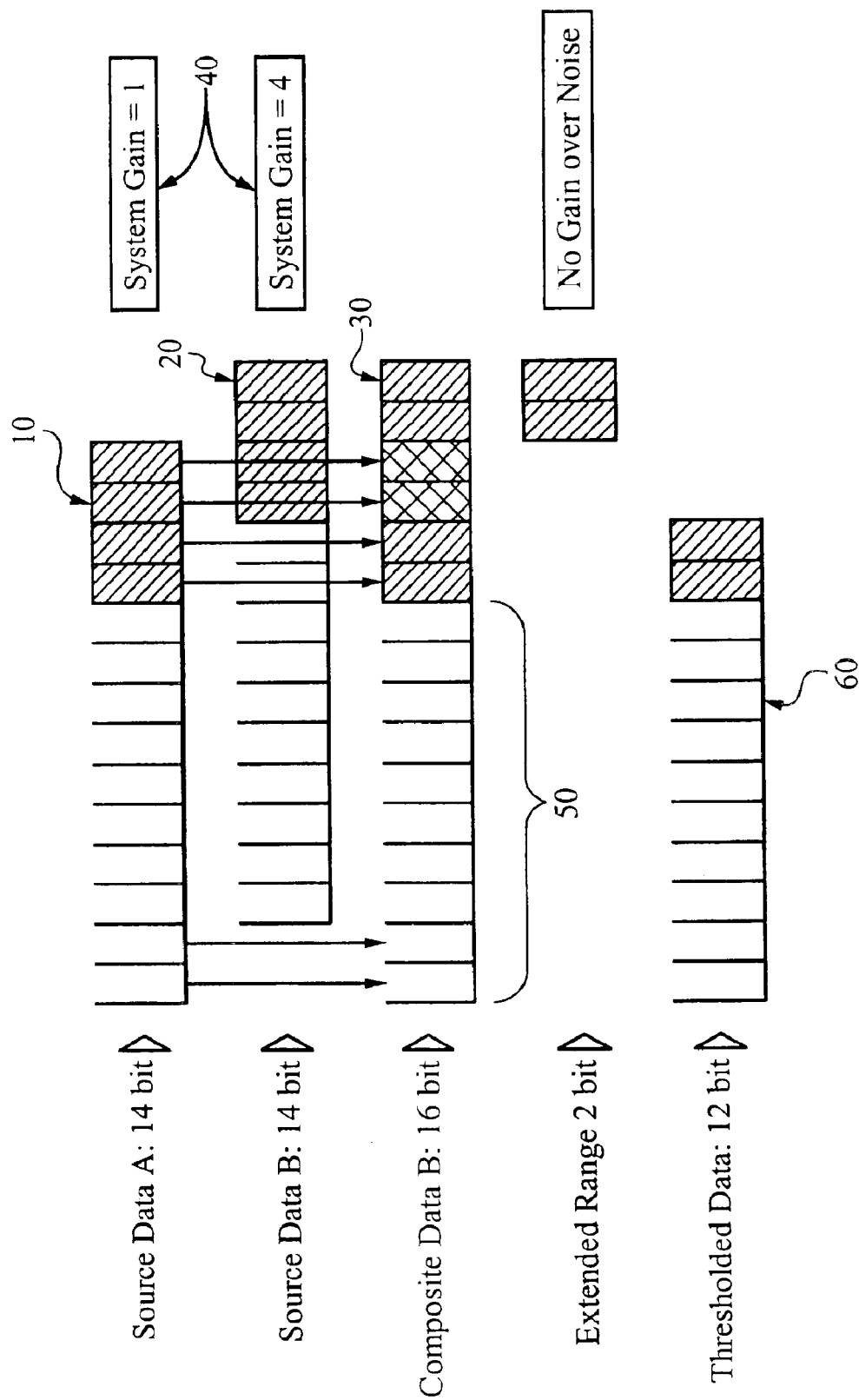
FIG. 1 is a schematic diagram of the prior art illustrating the increased noise effect in image pixels combined by simple offset addition.
Figure 2:
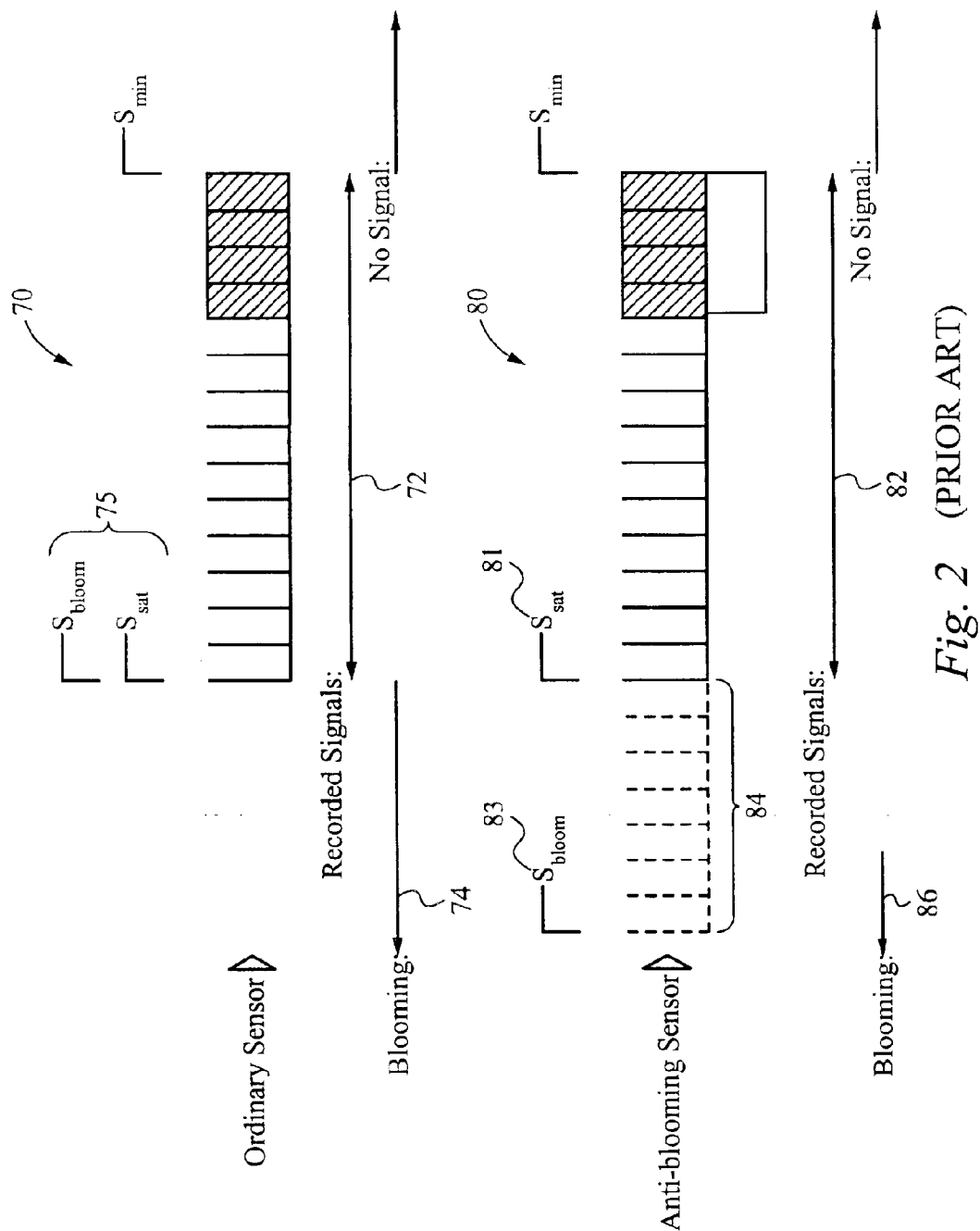
FIG. 2 is a schematic diagram of the prior art illustrating a comparison of the signal ranges of ordinary and anti-blooming sensors.

The present invention extends the useful optical density (OD) range of the samples that can be viewed as a single image. The present invention can produce an image that represents more than 100-fold extension of the brightness range of the a CCD camera. For example, if a CCD camera starts with a 12-bit image, the present invention can extend the dynamic range by 64-fold, an additional 6-bits. The present invention can extend theoretical dynamic range to 18-bits. Since the present invention can generate a 18-bit image that is beyond the range of the standard TIF file format, the data is compressed to 16-bit file format for storage. Although the present invention can extend the useful range of an image to more than 16-bits, its main advantage is in providing an enhancement of the useful optical dynamic range that takes full advantage of the 16-bit data format.

As an example, an overview of the operation of the present invention includes a sample where the brightest point of interest gives off 100,000 light units per second, and the other points are between 1 and 100,000. In this example, the range of brightness levels in the sample exceeds what can be stored in a 16-bit binary image file (i.e. 0 to 65,535). The method and apparatus of the present invention can capture the entire range of light levels or brightness from 1 to 100,000 and compress them into a 16-bit TIF file. Of course, some information is rounded off when 100,000 levels are compressed into the 65,535 values that can be represented in the 16-bit binary file format. The image generated by the present invention and compressed into the 16-bit TIF file format represents a wider range of brightness levels than would be contained in a standard image.

The method and apparatus of the present invention permits significantly brighter objects and very dim objects to be viewed together, in a single image, and more importantly, allows the bright objects to be displayed without saturation thereby keeping them within the measurable range of the image. Without the method and apparatus of the present invention, it would not be possible to visualize the very dim objects and the very bright objects in a single measurable image without the bright objects being saturated. The present invention provides a number of clear advantages: saving time in viewing one image versus flipping from one image to another; receiving results clearly, quickly, and easily by comparing samples across vast brightness ranges by visual inspection of a single image; saving money by reducing the number of prints needed for documentation; avoiding confusion from multiple image files for different exposure times; and freeing up disk storage space.

The text below and the accompanying drawings describe and illustrate examples of the preferred embodiments. These examples do not intend to limit the invention to those embodiments. On the contrary, the invention can be implemented in various ways as indicated by the teachings below.

Method for Processing Images

Figure 3:
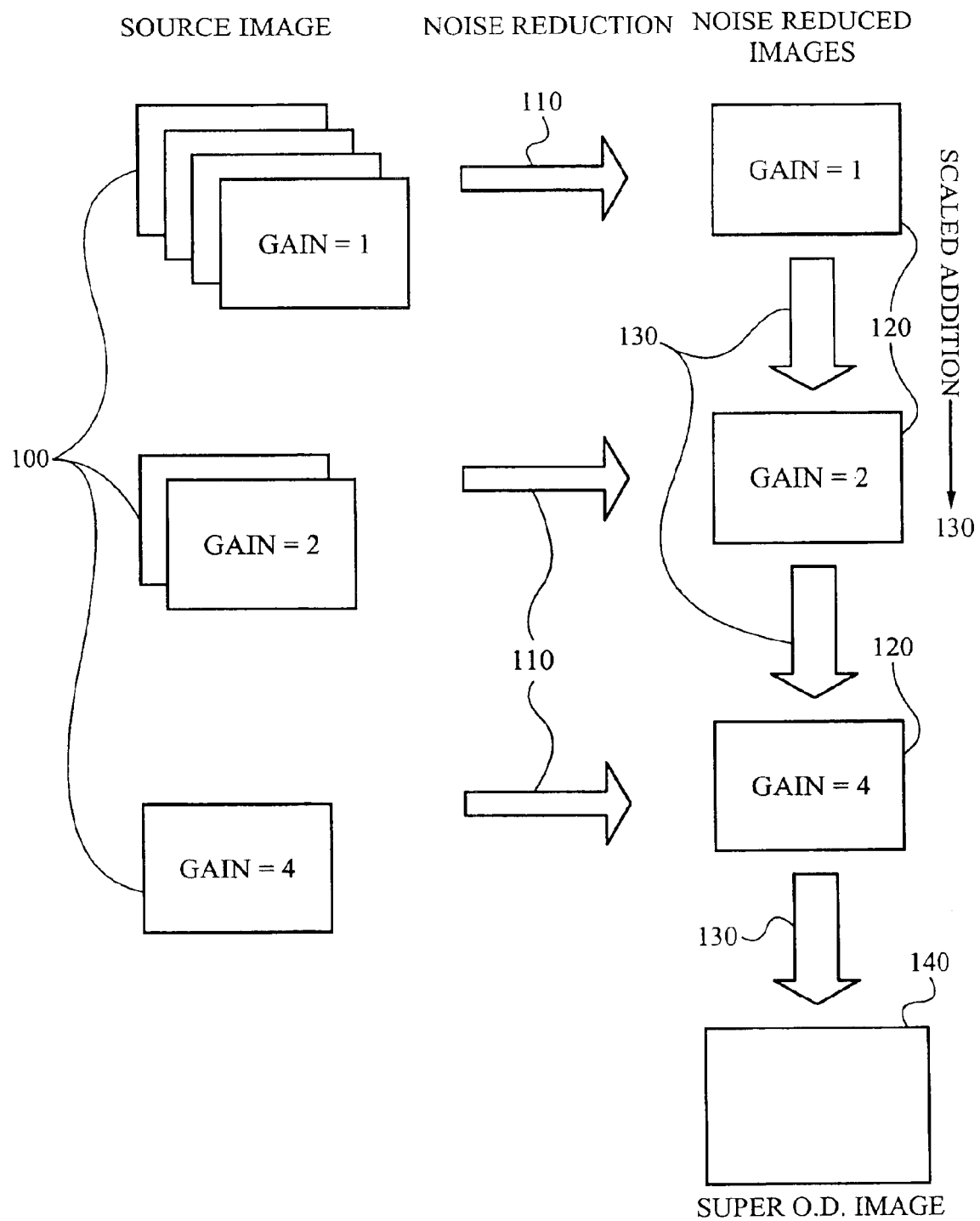
FIG. 3 is a block diagram of the preferred embodiment of the present invention illustrating an overview of dynamic range extending with noise reduction.

In the preferred embodiment of the present invention, the invention is a computational method and apparatus to extend signal range with noise reduction to produce a scaled composite image or equivalent data, as described below. The invention can be applied to data provided that sufficient source data is available, when the source data includes fully calibrated images, and the data scaling (gain) factors are known. FIG. 3 illustrates a schematic of the invention's method for combining images to produce an extended signal range, noise-reduced image. Source images 100 that were acquired under the same gain conditions (e.g. exposure time, amplifier gain) are grouped together and subjected to a noise reduction process 110 to produce composite Noise Reduced Images 120 for each acquisition condition. In one embodiment, the noise reduction process 110 can be performed by ensemble averaging the intensity values of corresponding pixels from images acquired at the same gain setting and placing the average value in a composite Noise Reduced Image 120. This procedure would be performed for each of the plurality of pixels within the Source Images 100.

Still referring to FIG. 3, the intensity value of a given non-saturated pixel will vary between the Noise Reduced Images 120 acquired at different gain conditions. For images acquired by CCD, CMOS, and like detectors, the intensity value for non-saturated pixels will be proportional to the exposure time (gain factor). These differences in data scaling are compensated for by rescaling the Noise Reduced Images 120 based on the normalized gain function. The pixel values for Noise-Reduced Images 120 are divided by the normalized system gain to produce scaled noise reduced component images 120. Corresponding pixel values for these latter scaled images are added to generate the noise-reduced extended signal range image 140. The process of rescaling and combining Noise Reduced Images 120 is called Scaled Addition 130. In further embodiments, the product of Scaled Addition 130 may be subjected to rescaling into the desired data storage format. The product of this process is called a Noise Reduced, Extended Signal image or Super O.D. image 140 for brevity.

One can consider the idealized case of zero noise images to focus attention on the signal range extension techniques. For this example, it is assumed that calibrated images (i.e. bias, dark and flat field corrections) are used as source images. The basis of the signal range extension relies on the inherent linearity of CCD detectors in response to incident light. High level signals are captured in fully illuminated relatively short exposure times ($t_1$) such that the CCD is not saturated (Image$_1$). Lower signal levels are captured by over exposing the bright regions of the object (Image$_2$ with exposure time $t_2$). The two images are then combined into a single image (Image$_{Final}$) with a simple scaling factor to normalize intensity levels Image$_{Final}$=($t_2/t_1$) Image$_1$+ Image$_2$. The resultant image contains both the low signals and the high signals. This technique can be extended to multiple source images, consider a composite of N images, $I_i$, each having an exposure time $t_i$, the final composite $I_{Final}$ is found by $$I_{Final} = M_f \sum_{i=1}^{N} I_i/t_i$$

for each pixel in the spatial dimensions. $M_f$ is an arbitrary scaling factor to fit the intensity data into the available data space (e.g. 16 bit file format).

Sensor and Method Operation

Figure 4:
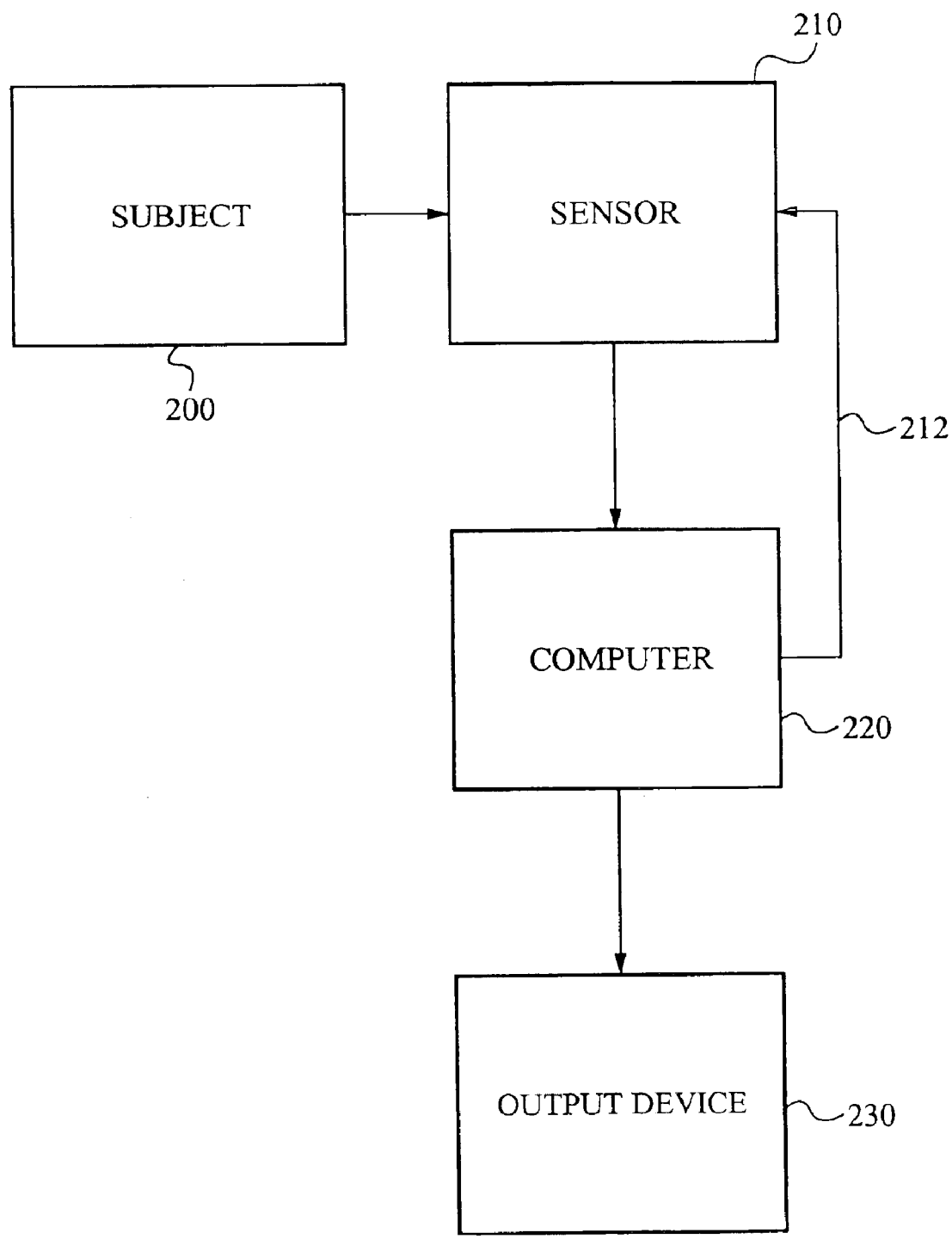
FIG. 4 is a block diagram of the preferred embodiment of the present invention illustrating the image acquisition apparatus.

In the preferred embodiment of the present invention, the method for producing a noise reduced, extended signal range image is coupled with the apparatus for acquiring images of a subject. FIG. 4 is a block diagram of a preferred embodiment showing one overall configuration of this invention, including the Subject 200 for imaging. The sensor 210 is controlled by the computer 210. Light coming from the Subject 200 is detected by the sensor 210, depicted here by path 212 and converted to digital data form. The digital data is transmitted to the computer 220. The program evaluates the digital data from the image and instructs the Sensor 210 to acquire additional images necessary to construct an extended dynamic range, noise reduced image. These images are acquired by the sensor 210 and transmitted to the computer 220 for processing and storage. Data and images from the computer can be shown by an output device 230 such as a video monitor, printer, or other commonly used data output device 230.

Still referring to FIG. 4, the sensor 210 is preferentially a CCD, CMOS, or the like. The sensor 210 is also preferentially an imaging sensor. CCD and CMOS sensors are available as two-dimensional pixel arrays that can generate images. Since a two-dimensional image may be formed on such a sensor 210, imaging sensors reduce or eliminate the need for detector scanning mechanisms. Additionally, CCD and CMOS sensors 210 produce linear output response compared to the incident light input and linear gain with respect to exposure time. Such sensors 210 are capable of generating data from all or a subset of the pixel elements. For this description both cases will be implied by the use of either method.

Practical considerations related to sensor performance affect the method's application and degree of extending the signal levels. CCD sensors may suffer from image defects known as "blooming" when the incident light causes electrons to overflow from one pixel to another. The sensor 210 preferentially resists overflow of saturated signal to adjacent photon detecting elements and resists blooming. The degree of overexposure, beyond the threshold for activating the anti-blooming protection, that the sensor 210 can withstand before image degradation from blooming is called the anti-blooming limit (ABL). In general, the degree of signal extension possible approximately equals the ABL. Each camera is an individual and the ABL must be determined on a case by case basis to be exact.

Frame transfer and full frame format CCD anti-blooming (AB) features are typically constrained to overexposure levels of less than 300 times the saturation level before the onset of blooming. Interline transfer CCDs with vertical AB drain can withstand overexposure levels of 1000 times the saturation level. Typical configurations of CCD AB features result in a trade-off between well capacity and degree of AB protection. An example is the ST8E camera (SBIG) in which the well capacity of the AB configuration is less than half that of the non-AB configuration. In addition, AB sensors often deviate from linear response before the maximum digital number output is reached. In part, the decreased linear response range results from the mechanisms applied to prevent blooming. In the preferred embodiment, the sensor 210 is equipped with anti-blooming or overflow protection technology. The sensor 210 may be contained within a camera assembly and coupled with means for transmitting a digital image to the computer 220. The sensor 210 may be cooled to further reduce noise. Moreover, cameras are available that conveniently combine such sensors 210 with appropriate data processing and communications electronics, temperature control, and optical elements. Thus, the sensor 210 may preferentially be a camera that combines the desired elements.

Image Acquisition Workflow

In the preferred embodiment, the method is implemented as a software program. The invention uses a number of parameters to achieve a user desired goal. The method may be optimized to achieve one or more user goals. The selection of such goals significantly impacts the order of computational operations and necessary parameters for application of the invention. These alternatives will be obvious to the skilled practitioner. The anti-blooming limit (ABL) is one parameter that is generally provided to the method. However, the method may be applied under constraints on acquisition time that make explicit use of the ABL unnecessary. Other parameters could include a rescaling coefficient that expresses the relationship between the bit length of output and input data as well as the number of images to be taken at each exposure time or "noise reduction profile." Additional parameters could be elaborated as required in alternative embodiments.

In a further embodiment of the present invention, the user provides a Dynamic Range Increase Factor (DRIF) as that goal. Achieving that goal will involve combining a series of exposure times. Typically, the range from the longest to shortest exposure will equal DRIF. In this embodiment, the ABL sets the practical upper limit for DRIF. If the baseline exposure is determined by the point before saturation, a DRIF equal to ABL results in a long exposure time before blooming of the brightest object in the baseline exposure. For an 8 bit digitized image from a CCD there are 256 potentially distinct intensity levels. If the CCD has an ABL of 1000, then intensity ranges up to 256000 can be realized using the invention. In additional embodiments, the baseline exposure time may be selected so that the brightest pixels are significantly above or below saturation. Obviously, these embodiments would alter the relationship between DRIF and ABL.

In a further embodiment of the present invention, an exposure time increment factor ($\propto$ or alpha) is used to determine the ratio between the current exposure time and the previous exposure time. Based on $\propto$, the number of exposure time steps required to reach the DRIF (N) can be calculated. To prevent data loss through blooming, the maximum exposure time would be limited by the ABL rather than the DRIF. For example, one might increase the exposure time by four fold. If the DRIF and ABL were 1000 and $T_1$ was 1 second, the image sequence would be 1 second, 4 seconds, 16 seconds, 64 seconds, 256 seconds, and finally 1000 seconds. The last exposure is less than the four-fold increase to 1024 seconds due to the 1000 fold ABL (and coincidentally, DRIF). Since the number of exposure steps is most easily an integer, DRIF may be presented as a discrete set of values rather than a continuous series.

The $\propto$ value may affect the quality of the data output. Smaller $\propto$ values result in a larger number of exposure times to reach DRIF and larger overlaps in signal range between adjacent exposure times. Since the greatest deviations from linear response are expected at the upper (saturation limited) and lower (noise limited) ends of the signal range, larger overlaps between signal ranges can reduce the effect of these deviations. Similarly, redundant data acquisition for a given object via multiple exposure overlaps would be expected to improve data linearity for non-saturated objects. This effect may be enhanced by filtering out intensity values at the ends of the signal range.

In additional embodiments, the user might select from a variety of factors other than DRIF, including output dynamic range, signal to noise ratio, baseline exposure time, total time to complete the composite image, noise reduction strategy, and the like. If multiple factors are used, a hierarchy might be established to maximize the number of goals that can be achieved. Alternatively, the goals could be preset internally in the method.

The exposure time for the first image in the series is determined as a baseline exposure time ($T_1$). In principle, the baseline exposure time can have any value with the time at which ABL is reached as an upper boundary. Within this limit, $T_1$ can be set by the user or pre-determined in the software. In the preferred embodiment, $T_1$ is determined automatically by use of an autoexposure method. Once $T_1$ is determined, the series of exposure times is set based on the $\propto$ factor. In alternative embodiments, other strategies may be used to determine the exposure time series.

Autoexposure can be performed by many known methods based on detecting the level of signal from the sample. Autoexposure can be performed with or without a corrective bias toward signal level. In one embodiment, an exposure time of $T_1$ generates a fully exposed image; that is an image with the highest signal value for any pixel approaches, but is less than, saturated. This permits light from the brightest parts of the subject to be measured within the linear range of the sensor. For example, autoexposure can be performed as follows: a short exposure time image is used, and the signal value of the pixel with the highest signal is recorded. The signal level required to saturate a pixel and the relationship between signal and exposure time are known characteristics of the sensor. For example, a 12 bit CCD camera, would produce a maximum DN of 4096 and its signal response would be roughly linear with time. Thus, the high signal pixel can be used to calculate an approximate exposure time that will saturate that pixel. This method may be modified to allow for non-linear response of the sensor as signal approaches saturation. Another modification would confirm the calculated exposure time by examining data from an exposure at that time. Other variations include selecting sub regions of the sensor, combining groups of pixels, or processing the image for exposure analysis.

In the preferred embodiment, the invention scales data from images acquired at different exposure times within the composite extended signal range image. Specifically, data acquired at the shortest exposure, $T_1$, represents the highest photon flux from the subject. Therefore, the result of processing this data will occupy the highest or most significant bits in the composite extended signal range image. However, this scaling affects both signal and noise in the source image. If the DRIF was, set at 1000, this would result in a concomitant 1000-fold rescaling of the noise component. The increased noise scaling could limit or defeat the advantage of increased signal range. To overcome this limitation, the invention applies noise reduction prior to assembling the composite image.

Errors

Data acquired by any method is subject to both error and noise. Error and noise have multiple sources and in some cases recognized solutions or mitigation strategies. Errors result from the non-ideal behavior of data collection systems. To the extent that these non-idealities are understood, they can be de-convoluted from the output data. For solid state sensors in optical imaging systems, three significant errors are bias, field non-uniformity, and dark current. Each of these errors can be mitigated by the appropriate calibration correction. It deserves note that these errors should be corrected for each sensor as configured for use since each will provide unique corrections. In the preferred embodiment, calibrated images are generated by performing these corrections. Since these corrections will be applied to all data, in the preferred embodiment, the calibration correction frames are constructed by noise reduction to minimize the introduction of additional noise via the calibration correction.

Dark current or dark signal arises due to thermal excitation of electrons within the sensor substrate. As such, it is not random noise, but an error. Thus, corrections for dark current may be made by subtracting a dark frame. Nonetheless, high dark current may limit the sensitivity of the sensor since signal levels below the dark current level would not be measurable. Refining the substrate prior to sensor construction can reduce dark current. More commonly, sensors are cooled to reduce thermal excitation within the substrate, and thereby lower dark current. Such cooling may readily be achieved by forced air, circulating liquid cooling, or Peltier effect devices depending on the degree of cooling desired. The remaining dark signal can be subtracted from a long exposure taken under dark conditions from the source image. In the preferred embodiment, sensor cooling and dark signal subtraction are applied to reduce the contribution of dark current.

Bias results from non-signal electron flow in the signal chain that is typically present in all cameras whether video or digital. A first order correction is to determine the offset from a zero exposure time image and subtract that value from all images. A more robust bias correction construction method relies on the signal linearity and removes the residual dark current signal as well as modest light leaks. An image of exposure time t (as short as possible) is taken along with an image of time 2t. Each image has a bias+dark+leak signal. The dark and leak signal are proportional to exposure time so $leak_{2t}=2leak_t$ and $dark_{2t}=2dark_t$. The bias image is constructed from the difference of the two images. This also removes the leak and dark signals. Because two images are used the need for noise reduction is even more important with this technique. The preferred embodiment uses most robust bias correction that is practical.

Non-uniformities across an imaging field can arise from multiple causes including vignetting, non-uniform illumination, internal reflections, differential scatter, and pixel response non uniformity. Various methods are known to construct flat-field corrections to such non-uniformities. Whatever method is used to construct the flat field correction, they can be used to deconvolve non-uniformities from the image. In the preferred embodiment, flat field correction is applied as an image calibration.

Noise Sources

Noise or uncertainty in the digital output has multiple sources. Chief among those relevant to this invention is "photon shot noise" or "signal noise." This noise arises from the quantum (statistical) nature of photons. Since photon shot noise follows a Poisson distribution, its value corresponds to the square root of the photon flux from the object. In practical terms, the photon flux from the subject correlates with the observed signal output (until saturation is reached), and shot noise increases with higher signal to a maximum of <2.0% of full scale for a sensor with a 12 bit ADC. Thus, one expects those pixels that generate high signal and short exposure time to have the greatest shot noise.

"Read noise" presents another significant source of noise. Read noise is correlated to functioning of the particular sensor or camera configuration. Read noise contains multiple sources and components; some are correlated or offset, others are random. Unlike shot noise, the magnitude of read noise does not increase with photon flux or signal intensity.

Instead, read noise accumulates with each readout of the sensor or image acquisition. Thus, the relative contribution of read noise can be diminished by increasing signal intensity in a given image to the high end of the linear response range. In other words, the contribution of read noise to the output data can be reduced by increasing integration time. Other things being equal, this might be achieved using a sensor with a greater well capacity. For typical CCD camera configurations, read noise levels are less than 0.1% of full scale. Taken together, shot noise is about 20-fold greater than read noise for full scale signal for the CCD camera configurations described in these examples.

Noise Reduction and Limits

In the preferred embodiment, noise reduction processing is applied to reduce noise in the data and increase the effective signal range extension. Since shot noise is statistical, it can be reduced by noise reduction methods that combine data from multiple measurements. By this approach, shot noise can be reduced by a factor equal to the square root of the number of measurements combined. In principle, one could acquire a sufficient number of measurements to eliminate shot noise. However, making multiple measurements for noise reduction increases the time necessary to acquire a source data set. Fortunately, the measurements that benefit most from noise reduction correspond to the shortest exposures. This minimizes the increase in data acquisition time.

With regard to noise reduction, a straight forward approach in one embodiment is ensemble averaging of images having the identical exposure time. By this method, a series of subject images having the same exposure time are acquired. The values of corresponding pixels from each of these images is summed and divided by the number of images to compute the arithmetic mean of the image set. The result is recorded in a result matrix that represents the average image. This process is repeated for each of the plurality of pixels. This method reduces random noise such as shot noise by the square root of the number of images averaged. In an alternative embodiment, ensemble averaging is replaced by determining the median of the image set. This method is particularly useful in reducing intermittent high signal noise that might appear in a few, but not most images. Such noise may be observed as a result of cosmic rays interacting with the sensor. In further embodiments, more complex statistical methods may also have value in noise reduction.

In further embodiments of the present invention, where lower resolution images are acceptable, noise reduction can also be accomplished by combining data from multiple pixels within the same image. Pixel electrons can be combined at acquisition readout through "binning" of adjacent pixels. For example, adjacent pixels might be combined in 2×2 or 3×3 groups to yield binned superpixels with well capacities equal to four or nine individual pixels, respectively. One advantage of "on chip" binning is the potential reduction of readout noise. In the best cases, the readout noise of the binned "super pixel" is the same as an individual pixel. However, the reduction in readout noise is limited by the specific readout architecture of the sensor. Alternatively, pixel values can be combined after acquisition by averaging, summation, or median. These latter methods may reduce random noise, but would not be expected to significantly reduce the non-random components of read noise. Obviously, noise reduction methods that combine multiple images may be combined with methods that combine pixels within an image.

In the preferred embodiment, the lower limit for standard noise reduction methods applied to digital data is the quantization noise limit. Quantization noise arises from the process of converting continuous analog voltages to discrete digital numbers. Since a digital bit may only have the values 0 or 1, the conversion process may produce noise related to the fixation of the last bit. When expressed in digital numbers, quantization noise equals the inverse square root of 12 or approximately 0.29 digital counts. For a 12 bit ADC, this corresponds to less than 0.01% of full scale. This is significantly less than the other noise sources described. Moreover, in many cases, reaching the quantization noise limit presents an impractical goal given the large amount of data required. For an 8 bit digitized CCD the noise reduction factor is $256/12^{-1/2}=886$. Random noise is reduced by the square root of the number of sub-frames combined which means 786,432 sub-frame images must be combined to reach this goal.

Clearly a range of methods can be applied to reduce noise. Given the various sources contributing noise, solutions for improving signal to noise with respect to those sources, and associated costs for those solutions, different combinations may be used to achieve the desired balance of overall performance. For example, one might limit the total time required for data acquisition. Based on that constraint, the number of images acquired for noise reduction and the exposure times at which they are acquired might be reduced. Reducing the number of images could limit signal to noise achieved in the extended signal composite. Alternatively, one might desire to produce an image with the higher signal to noise at the sacrifice of data acquisition time. In this case, one can select the linear response range or a subset of that range with the desired signal to noise character for combination in the composite final image. In essence, this approach extracts the best data with respect to signal to noise and linearity from each image. Alternativelly, one might preferentially select images with low noise. Taken together, the effects presented make it clear that the method for selection of the source images is of great importance to this technique. In the preferred embodiment, the particular selection of noise reduction strategy is optimized for the application to which the method is applied.

In the preferred embodiment, having determined a DRIF, a set of exposure values, and a noise reduction profile, the method automatically directs the sensor to acquire the source image set. Preferably, the photon flux from the subject to the sensor remains constant during image acquisition. To prevent data loss due to computational truncation, these images are preferably represented in appropriate data forms to prevent such loss. For example, 12-bit integer raw image intensity data may be represented in 32 bit floating point form for computation. These methods are well known to the average practitioner. In the preferred embodiment, system errors (including bias, dark current, and field non-uniformities) are deconvoluted from the raw source images to create a set of calibrated source images. Noise reduction may then be applied to the calibrated images to create the noise reduced source images.

In the preferred embodiment, extending the signal range is achieved through the combination of the noise reduced source images. In a further embodiment, the process for combining images may be described as scaled addition. In this embodiment, scaled addition represents the integration of photon flux from the subject to the sensor over the data acquisition series. To achieve this, images are rescaled in proportion to the integrated photon flux before these images may be combined by addition. As described, the signal generated by integrated photon flux is proportional to exposure time for a non-saturated CCD sensor. Thus, images may be rescaled according to their exposure time. In one embodiment, each noise reduced source image is divided by the normalized exposure time. For example, if the baseline exposure time ($T_1$) is five (5) seconds, each of the plurality of pixels within the noise reduced source image resulting from ten (10) second exposure would be divided by two (2). Similarly, a twenty (20) second exposure would be divided by four (4).

It will be obvious to the practitioner that rescaling can be accomplished by various computational approaches. For the example above, the same result may be accomplished by shifting the successively longer exposure images one bit toward the least significant bit relative to the immediately shorter exposure image. Thus, embodiments that limit exposure time increments to powers of two may be more computationally efficient. In an alternative embodiment, noise reduction and scaling operations might be performed in parallel by restricting choice of method parameters. In one case, exposure time increments and noise reduction profile could be coordinated to reduce the number and complexity of computational operations. For example, the method might be configured to acquire twice as many exposures for each halving of exposure time. This might yield four 5 second images, two 10 second images, and one 20 second image. The scaled, noise reduced composite of these images could be produced by the addition of these seven images.

In further embodiments, intensity data could be interpreted by taking advantage of features with known brightness in the subject. The use of such control features would permit data rescaling and normalization during image composition. For example, the subject may contain features whose relative photon flux is known. Consider for example, a set of exposures from a noiseless 12 bit sensor (nominal range 4096) of a subject contains three control spots with known relative photon flux of spread by 100 fold, that is 1,100, and 10,000. In one image, the brightest spot might have an intensity of 4000 while the middle brightness spot has an intensity of 40. In the next image, the brightest spot is saturated while the middle brightness spot now has an intensity of 3000. If the sensor response were linear over this entire range, one would expect the dimmest spot to have an intensity of 30. If instead, one determined the dimmest spot to have a value of 80, the data from the one image could be normalized to generate the same response line as the other image. In these cases, the images can be combined by using the observed intensity and calibrating it based on the known photon flux, without prior knowledge of the exposure time or other gain setting. Obviously, this method could be improved by the consideration of additional control data.

In further embodiments, the intensity value computed in the Super OD image may not share a linear relationship with the photon flux of the subject, as in any detection system. In such cases, the control features would permit interpretation of the final extended signal range noise reduced image. In these embodiments, a standard curve is computed by plotting the observed intensity values against the known photon fluxes for the control spots. Based on this standard curve the photon flux values corresponding to the observed intensity may be calculated for unknown areas of the subject. These interpolations could be made using a linear or a non-linear curve. In one embodiment, the Super OD image may be transformed based on the standard curve to create a data array that corresponds to computed photon flux or equivalent value.

It is preferable that computational processing of some source images may occur while others are being acquired. In one embodiment, this is accomplished through the use of multiple computational processors. Computer "mother boards" with provision for multiple central processing units are well known. In an alternative embodiment, other digital signal processing devices may be used. In this embodiment, the overall time required for the method to operate is reduced by performing the bulk of computation within the time minimally required for image acquisition. This may be accomplished through use of a computer operating system support for multiple processors or preferably through optimization of the method implementation to facilitate use of multiple processors.

In the preferred embodiment, the extended signal range, noise reduced composite data is scaled into a pre-determined format for storage. In further embodiments, the original source data might have 12 bit depth, and the output could be limited to 16 bit depth or 16-fold greater DN. Since signal range may readily be extended 1000-fold, the maximum extended signal range would easily exceed direct 16 bit representation. For this reason, the output data may be rescaled. In one embodiment, the output rescaling is accomplished by multiplying the resultant image from scaled addition such that the maximum value from scaled addition maps to the maximum output signal value desired. In the preferred embodiment, this factor may be approximated by the ratio between increase in bit depth and the sum of the inverse of normalized exposure values. Alternatively, a logarithmic or other non-linear transformation function may be used to rescale data for storage. In this case, the output file would preferably be tagged to distinguish it from non-transformed data. In an alternative embodiment including the extended signal range, noise reduced data may be truncated to fit the storage format. In another embodiment, combinations of rescaling and truncation may be used.

The final output scaled, extended signal range, noise reduced composite data may be stored as a digital file in any number of formats. In the preferred embodiment, this data file might be output as either image data in pixel format, intensities of pixels, or as a report on objects within the image. In the preferred embodiment, various modes may be used to output the final data including, digital files, database entries, printed copies, or screen displays. It should be noted that most printed or screen displayed images are limited to 256 intensity scales. Therefore, it may be desirable to use methods such as false color and rescaled image intensity values to advantageously display the data. The method for generating extended signal, noise reduced composite data may be further improved by addressing limits to linearity and signal to noise ratio. To discuss these embodiments, it may be useful to consider each of the plurality of pixels as generating an independent data series. In some embodiments, the data series will be a series of exposures, some of which will vary in exposure time or other scaling factor. From this perspective, each pixel may be processed in an optimal manner as suits its value. The quality of points in this data series may be distinguished by linearity of the output DN with respect to the input photon flux and signal to noise ratio. At the high signal end, linearity may be limited by saturation. One known method to deal with saturation is to use the "last exposure before saturation" for signal range extension. This approach does not take advantage of the improved certainty of data that results from multiple exposures. One embodiment improves the "last exposure" algorithm by defining the linear response range for the sensor and applying the signal extension method to that range. However, values within the linear response range may vary in their signal to noise ratio. In the preferred embodiment, both linearity and signal to noise ratio of the final extended signal range composite may be considered in determining the data composition algorithm. In other embodiments it may be possible to achieve these goals without reference to the values contained in an acquired image. In one embodiment, extended signal range images from multiple subjects of similar photo flux composition may be achieved by a series of calibrations to the method and apparatus.

Imaging Apparatus Embodiment

Figure 5:
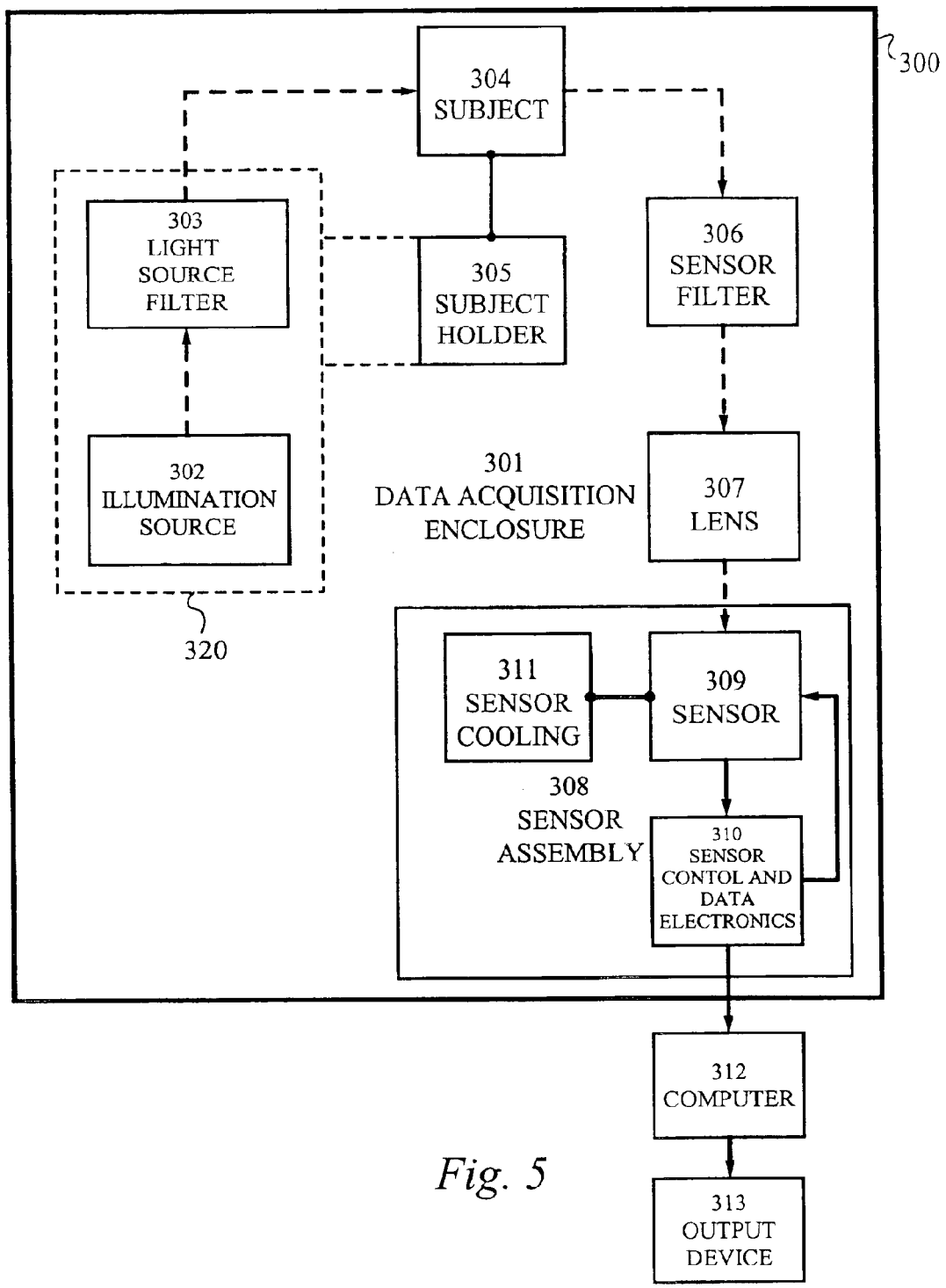
FIG. 5 is an additional block diagram of the preferred embodiment of the present invention illustrating the image acquisition apparatus.

In the preferred embodiment of the present invention depicted in FIG. 5, the method is applied in conjunction with an imaging apparatus 300. Among other functions, this imaging apparatus 300 maintains a constant rate of light emission from the subject by placing subject, illumination, and sensing means within a data acquisition enclosure 301. Given the broad application of this method for extending signal range, the imaging apparatus 300 may be of diverse constructions.

In the preferred embodiment, the data acquisition enclosure 301 need not be light tight to achieve this goal, as long as the data acquisition enclosure 301 can prevent fluctuations in the rate of light emission on the time scale required for data acquisition. One example of a data acquisition enclosure is the ChemiImages 5500 scientific imaging system (IS-5500, Alpha Innotech Corporation, San Leandro). This scientific imaging system is equipped with a light-tight portable darkroom (DE500 MultiImage FCO cabinet) that provides various options for the selection of illumination source 302, light source filter 303, subject holder 305, sensor filter 306, and lens 307. In some cases, various components of the diagramed data acquisition enclosure 301 may be comprised of the compound of several devices. In addition, individual elements may be omitted based on the subject to which device is applied. A simpler, but compound configuration is exemplified by the AlphaDigiDoc 1000 (AD-1000, Alpha Innotech Corporation, San Leandro). In this example, the illumination source 302, light source filter 303, and subject holder 305 are provided by the operator. Typically, the illumination source 302 and light source filter 303 form a single device called a light box 320 or a transilluminator 320. The light emitting surface of the transilluminator 320 forms the subject holder 305. When configured to be held in place by gravity, the subject 304 placed on the subject holder 305, and the AlphaDigiDoc device rests on top of the subject holder 305, over the subject 304 for image acquisition. Another data acquisition enclosure 301 is exemplified by the AlphaArray 7000 Microarray Reader (AA-7000, Alpha Innotech Corporation, San Leandro). This latter example provides automated means to focus the lens 307, exchange the source filter 303 and the sensor filter 306, as well as collect data from a plurality of subjects through automated control of subject holder 305 movement and image acquisition.

In the preferred embodiment, the illumination source 302 is optically coupled to the light source filter 303 and the subject 304 to provide illumination of the subject 304 by the desired wavelengths of light at the desired intensity.

Still referring to FIG. 5, the method for signal range extension is broadly applicable to analyzing the interactions between a wide variety of sample molecules and analytes bearing any of numerous tags. The Subject 304 may be a biological or chemical sample or a plurality of chemical or biological samples. Chemical samples might include, but are not limited to, tags, identification taggants, paints, markers, environmental pollutants, pesticides, herbicides, small particles. Biological samples might include naturally occurring or synthetic biomolecules. Examples of biomolecules include but are not limited to: nucleic acids, oligonucleotides, protein nucleic acid, proteins, peptides, enzymes, enzyme substrates, lipids, sugars, oligosaccharides, carbohydrates, iectins, vitamins, receptors, receptor ligands, agonists and antagonists for receptors, antibodies and epitopes, toxins and venoms, hormones, cofactors, multimolecular complexes, macromolecular complexes, and drugs. Alternatively, these samples might be chemical reactions or the products of chemical reactions. Other biological samples might include cells, organelles, tissues, organs, embryos, or organisms.

These samples might be arranged in a regular pattern or as disposed by natural, synthetic, or random process. The samples may be attached to or resting on a surface, submerged partially or wholly in a medium, contained in a recess or plurality of recesses, enclosed in a container or plurality of containers, or other arrangement that suits the operator.

The samples or analytes in the subject are capable of being tagged or marked, directly or indirectly. Such materials may be tagged with molecules that can be detected by direct inspection, radioactive emission, fluorescence (immediate or delayed), chemilluminescence, bioluminescence, phosphorescence, resonance light scattering, quantum dots, and the like. Alternatively, the samples may be inspected by reflected light with or without calorimetric tags. Tags for fluorescence, phosphorescence, resonance light scattering, and quantum dots absorb and are excited by light at one wavelength and emit light at another wavelength. These latter tags require means for excitation of the tags with light of one wavelength to the exclusion of other undesired wavelengths and detection of the second wavelength to the exclusion of other undesired wavelengths. In the preferred embodiment, such means would be provided by the appropriate combination of illumination source 302, sensor filter 303, and emission filter 306.

In the preferred embodiment, the selection of illumination source 302 depends on the nature of the subject 304 to be imaged. For chemilluminescent, bioluminescent, or phosphorescent reactions or materials, the subject 304 would emit light without concurrent excitation illumination. In these applications the illumination source 302, excitation filter 303, and sensor filter 306 might be eliminated or unused. Alternatively, one might retain the emission filter 306 to measure light at various wavelengths as might be applied to stars (which are of course self-illuminating) on a clear night.

The illumination source 302 may be a lamp that provides broadband or "white" light. Such lamps may emit larger intensities of some wavelengths (spikes) than others. Many types of lamps that produce broadband light are known including: incandescent, fluorescent, xenon, metal halide, super high pressure mercury, HMI, HSD, HTI, arc stream, arc, axial AC, quartz lamps, and the like. Alternatively, the illumination source 302 might emit a narrower spectrum such as ultraviolet or infrared light. In the area of molecular biology, ultraviolet lamps are well known, such as those used in mineral lamps or transilluminators for the visualization of nucleic acids tagged with ethidium bromide or other fluorescent dyes. In some instances, the illumination source 302 may be a solid state or gas phase laser and require additional means to spread or scan the light over the area to be illuminated. In other embodiments, the illumination source 302 may be a light emitting diode (LED) or a plurality of LEDs. The illumination source 302 may take the form of a flat panel display.

The illumination source 302 may be configured with a reflector, dichroic reflector, lens, or other such optical device to improve its function. In addition, the illumination source 302 may be configured with refractive devices such as prisms, diffraction gratings, beamsplitters and the like to select desired wavelengths of light.

Depending on the nature of the subject and the data sought, it may be desirable to provide means for selecting the desired wavelengths of light for illumination. This can be accomplished by use of a light source filter 303. The light source filter 303 may variously be provided as a transilluminator, band pass, short pass, long pass, or dichroic filters. The apparatus may include means for manual or automatic exchange of light source filters. Neutral density filters or gratings may be used to modulate the amount of light. Filters for ultraviolet or infrared light as well as polarizing elements may also be used.

In the preferred embodiment, the subject holder 305 permits positioning of the subject 304 so that the sensor 309 can detect light from a plurality of points on the subject 304, or portion of the subject 304. The subject 304 can rest on or be retained by the subject holder 305 within the Data Acquisition Enclosure 301. Various subject holders 305 may be used as best suits the Subject 304. The Subject Holder 305 facilitates maintaining the field of view and focus of the Subject 304 relative to the Sensor Assembly 308. The DE 500 cabinet may be equipped with adjustable height sample trays that may be utilized as subject holder 305. In other embodiments, the Subject Holder 305 includes mechanisms to provide controlled motion in one to three orthogonal axes or to provide various rotations of the Subject 304 relative to the Sensor Assembly 308. Some scientific imaging systems use such motion mechanisms to permit exchanging of samples. The AlphaArray (Alpha lnnotech Corporation, San Leandro) can be equipped with a Subject Holder that retains subjects (approximately 1"×3") and uses a motorized X-Y table to move a Subject Holder 305 to provide views of various portions of a Subject 304 or views of various subjects 304.

For example, the operational process can start with the user (or automated means, e.g. X-Y-Z translation stage or robot) positioning the subject relative to the sensor. The user or present system might determine the appropriate illumination conditions for the subject. In one embodiment, movement of the subject holder 305 relative to the sensor 309 provides an alternative to focusing the lens 307.

In the preferred embodiment, the sensor filter 306 transmits the desired wavelengths of light to the lens 307. The sensor filter 306 also blocks transmission of undesired wavelengths of light. The sensor filter 306 may be provided in various types or constructions akin to the light source filter 303. However, these sensor filters 306 must be of imaging quality and preserve in the image projected onto the sensor 309 the spatial relationships between points in the subject 304. In addition, the sensor filter 306 preferentially avoids the introduction of reflections that cause ghost images. In some embodiments, this may be accomplished by tilting the sensor filter 306 so that its plane is not orthogonal to the imaging axis. Alternatively, the sensor filter 306 may be placed between the lens 307 and the sensor 309.

Another consequence of the sensor filter 306 is simplifying the contribution of quantum efficiency in sensor 309 performance. When used with a particular sensor filter 306, the range of relevant quantum efficiencies for the sensor 309 is restricted to those wavelengths passed by the sensor filter 306 to the sensor 309.

In the preferred embodiment, the lens 307 focuses light from the subject 304 onto the sensor 309. A variety of optical lens types may be used including simple and compound lenses, fixed or adjustable focus, fixed or variable aperture, and fixed or variable focal length. The various adjustments on the lens 307 may be manual or motorized. In some embodiments, the lens 307 may be included in the sensor assembly 308. In some embodiments, additional lens 307 elements may be affixed directly on the sensor 309.

In the preferred embodiment, a sensor assembly 308 is provided that includes the sensor 309, sensor control and data electronics 310, and sensor cooling 311 to reduce dark current. The sensor assembly 308 may also provide a shutter. In the preferred embodiment, the sensor assembly 308 is a digital camera, although analog cameras configured with digital conversion electronics may be used.

The sensor 309 detects photons from the subject 304 and is preferentially a 2-dimensional imaging sensor with linear output response compared to the desired light input and linear gain with respect to exposure time. The sensor 309 preferentially resists overflow of saturated signal to adjacent photon detecting elements. The sensor 309 is preferentially a two dimensional CCD or CMOS device with anti-blooming capability.

In embodiments wherein the subject holder 305 is mounted on means that provide movement in an X-Y direction, the imaging apparatus 300 may operate by acquiring images from one portion of the subject 304, then moving the subject 304 before acquiring images from another portion of the subject 304. Thus the imaging apparatus 300 may combine images that represent different portions of the subject 304 into a mosaic or stitched image. Signal range extension can readily be applied to images for any portion of the subject represented in the mosaic. If different portions of the subject 304 vary in their signal intensity, differing gain conditions or exposure times might be desired to optimally capture signals from each portion. Thus, varying levels of dynamic range extension could be applied to each portion to generate a mosaic. In some cases, one might not apply noise reduction to one portion (e.g. long exposure) of the mosaic while applying it to others (e.g. short exposure). In this embodiment, the component noise reduced images are scaled with respect to gain, but may be combined as a mosaic rather than a single field of view. It will be obvious that one can also construct a mosaic based on portions of a single field of view may similarly be subjected to varying levels of signal range expansion. The latter embodiment will be of particular interest with detection devices capable of sub-frame readout.

In further embodiments, the sensor 309 could be any device that can produce a 2-dimensional digital representation of an image. Other sensors known in the art include: amorphous silicon, passive and active pixel sensors, photomultiplier tubes (PMT), microchannel plates, vidicon tubes, and photodiodes. For some sensors, the proportionality factor between light received and DN signal output can be modified by adjusting sensor gain. Specifically, the gain of a PMT can be increased by increasing the voltage applied to the device. Increasing the PMT voltage typically causes an approximately logarithmic increase in sensor gain. Altering the PMT gain will also modify the linear response range of the sensor. By contrast, CCD, CMOS, amorphous silicon and active pixel sensors are particularly easy to use for photon counting because their gain is typically fixed and their DN output response is proportional to exposure time for non-saturated pixels. If the subject emits light at a constant rate, the signal (S) is a linear factor of the exposure time (T) within the linear response range of that sensor.

For each detector, application of this method requires calibration of the image combining algorithm to the system gain. For CCD detectors used in this invention, the system gain is proportional to the exposure time. For other detectors, the system gain can be determined empirically and this data can be subsequently applied in the image combining algorithm.

Thus, in the preferred embodiment, the illumination source 302, the light source filter 303, the subject 304, the sensor filter 306, the lens 307, and the sensor 309 are optically coupled. One skilled in the art will recognize that these elements may be coupled through the use of additional optical components including, but not limited to fiber optic cables, prisms, diffraction gratings, beam splitters, mirrors, lenses, filters and the like. Similarly, the particular order and arrangement of these elements may be exchanged while retaining the function of elements described.

In the preferred embodiment, the computer 312 accepts user input, executes the software program that encodes the method, directs image acquisition, combines images, and instructs the output device 313. The computer 312 also provides storage for data in memory and disk as well as connection to ordinary peripheral devices including output devices 313.

Combination with other Image Processing Methods

In the preferred embodiment, the method for signal range extension with noise reduction can be applied as a digital signal processing (DSP) step. Thus, it may be combined with other DSP methods including filters, methods for identifying objects in images (by edge detection, thresholding, overlay, and the like), methods for quantifying intensity values of objects based on intensity or location, methods for analyzing object value quantities within one or multiple data set. In the last case, these methods may be combined with analytical methods for normalization, mathematical comparison, or statistical evaluation of results.

Figure 6:
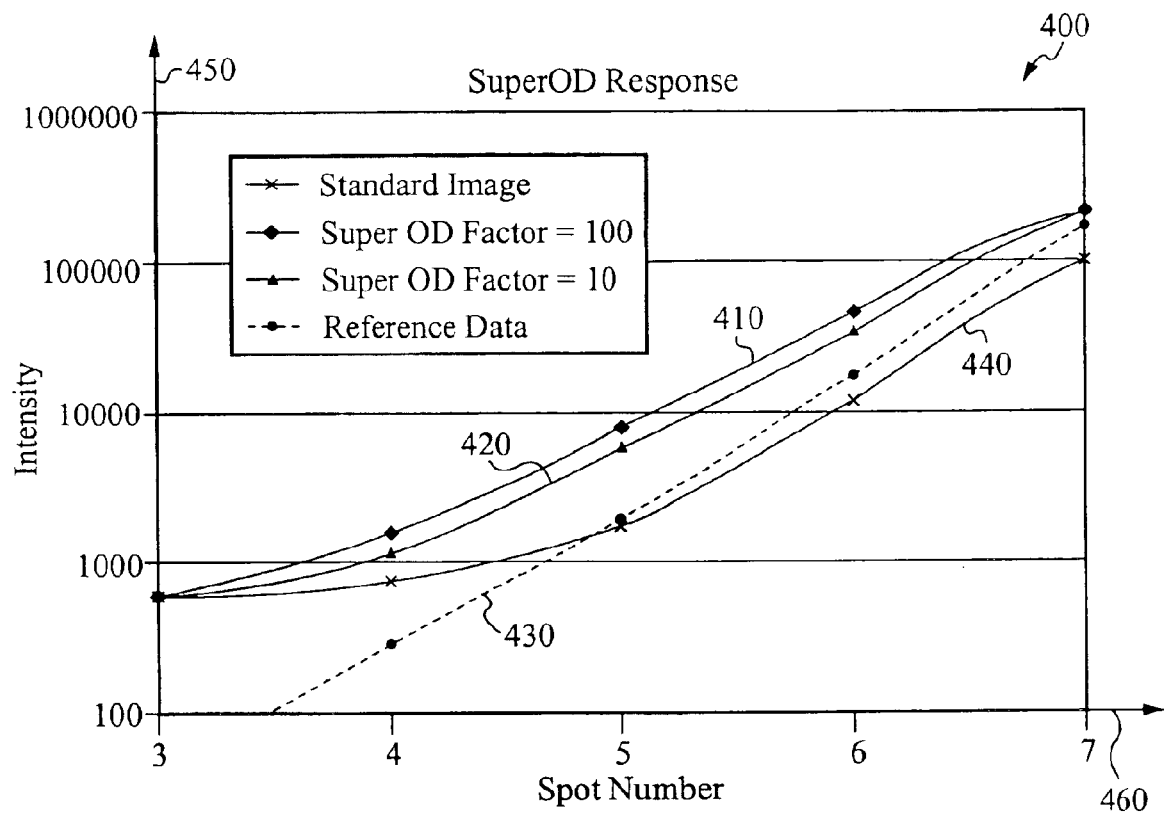
FIG. 6 is a graphical representation of an exemplary output of the present invention.

FIG. 6 depicts an output graph of the preferred embodiment of the present invention. While the graph in FIG. 6 depicts values that can be derived from outputs produced by the method and apparatus of the preferred embodiment of the present invention, the graph is only exemplary, as the method and apparatus of the preferred embodiment of the present invention may output a nearly unlimited number of outputs based upon the subject and the settings inputted by the user.

FIG. 6 presents a response 400 of the present invention with a reference data graph line 430. The relative intensity of each sample was graphed on an intensity axis 450 against the number of spots on the spot number axis 460. The relative intensity of each spot is measured from a standard image (SuperOD=OFF), illustrated by the standard image graph line 440, and using SuperOD acquisition at two levels of signal range extension (SuperOD=10 and 100), illustrated by the 10 factor graph line 420 and the 100 factor graph line 410, respectively. The reference data graph line 430 for the plate shows that it is linear across the range of spots. As the SuperOD factor is applied first at 10 and then at 100, the intensity observed becomes more linear (as is evident in the 10 factor graph line 420 and the 100 factor graph line 410) when plotted against the spot number, thereby approximately matching the linearity of the standard image graph line 440 and reference data graph line 430, while achieving a higher relative intensity. This increase in signal range provides more signal from the dimmer spots while keeping the high signal from the brighter spots below saturation.

The increased linear response range in this example can be quantified by linear regression analysis of different spot ranges for the different SuperOD factor settings shown in Table 1 below. The coefficient of determination ($r^2$) value is the typical measure for the quality of a least squares linear regression fit. The reference plate has seven decades of linear response, so the spot range evaluated for linearity varied from 1 thru 7 to 5 thru 7. $r^2$ values closest to 1.0 are best, so high $r^2$ values (greater than 0.99) have been highlighted in red. The standard image has a high $r^2$ value for spot range from 5 thru 7. When the SuperOD factor is 10, the spot range from 4 thru 7 also has a high $r^2$ value. Increasing the SuperOD factor to 100, adds the spot range from 3 thru 7 to the high $r^2$ value set.

TABLE 1

| Spot Range | Standard Image | Coefficient of determination ($r^2$) SuperOD factor = 10 | Coefficient of determination ($r^2$) SuperOD factor = 100 |
|---|---|---|---|
| 1 thru 7 | 0.802 | 0.840 | 0.885 |
| 2 thru 7 | 0.860 | 0.907 | 0.942 |
| 3 thru 7 | 0.927 | 0.971 | 0.991 |
| 4 thru 7 | 0.974 | 0.996 | 0.999 |
| 5 thru 7 | 0.999 | 0.997 | 0.997 |

Figure 7:
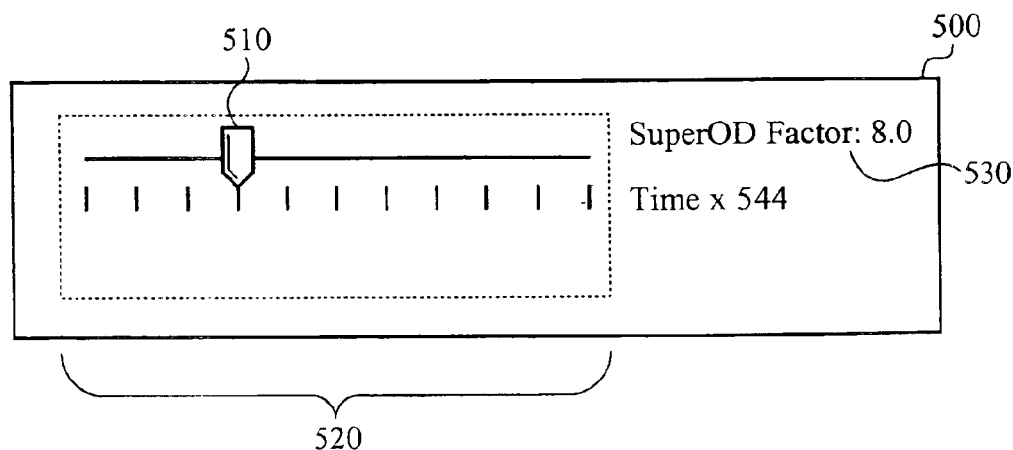
FIG. 7 is an exemplary graphical user interface of the present invention.

FIG. 7 depicts a graphical user interface (GUI) 500 of the preferred embodiment of the present invention. Using this GUI 500, the user can set the degree of the SuperOD acquistion from zero (SuperOD=OFF) to full extension which is a 500 fold increase in dynamic range. This is simply done by using a slider 510 over a scale 520 in order to set the SuperOD at the desired range. The slider 510 is able to set the SuperOD factor, the control variable for SuperOD acquisition, to one of nine preset values from 2 to 500. The factor display 530 in FIG. 7 reads "8.0", and is meant Although Super OD acquisition can extend the dynamic range by up to 500-fold, the limits of SuperOD performance will vary depending on the sample used and other factors.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention.

What is claimed is:

1. A method of extending a signal range of a digital image, the method comprising:
   a. duplicating the digital image such that a plurality of source images are formed, each of the source images including a predetermined number of the duplicated digital images;
   b. scaling each of the plurality of source images, wherein the scaling is based upon a gain value assigned to each of the plurality of source images and wherein the gain value for each of the plurality of source images is $2^x$, such that the highest gain value will not exceed $2^x$ where x is an integer less than or equal to 10, and each successive gain value will have a value of $2^{x-1}$;
   c. reducing a noise component in each of the plurality of source images, such that a plurality of noise reduced images are formed corresponding to each of the plurality of source images; and
   d. adding the plurality of noise reduced images.

2. The method as claimed in claim 1 further comprising receiving the digital image in a sensor and sending the digital image to a computer.

3. The method as claimed in claim 1 further comprising outputting the sum of the plurality of noise reduced images to an output device.

4. The method as claimed in claim 1 wherein each of the plurality of noise reduced images includes a single noise reduced image.

5. The method as claimed in claim 1 wherein the predetermined number of duplicated digital images in each of the plurality of sources images is determined by $2^x$, wherein x is equal to 0 for the source image having the highest gain value, and each successive source image will have a number of duplicate digital images according to $2^{x+1}$.

6. The method as claimed in claim 5 wherein a user can set the highest gain value and the number of the plurality of source images.

7. The method as claimed in claim 1 wherein when reducing the noise component in each of the plurality of source images, the computer averages each of the plurality of source images.

8. An apparatus for extending a signal range of a digital image, the apparatus comprising:
   a. means for duplicating the digital image such that a plurality of source images are formed, each of the source images including a predetermined number of the duplicated digital images;
   b. means for scaling each of the plurality of source images, wherein the scaling means are based upon a gain value assigned to each of the plurality of source images and wherein the gain value for each of the plurality of source images is $2^x$, such that the highest gain value will not exceed $2^x$ where x is an integer less than or equal to 10, and each successive gain value will have a value of $2^{x-1}$;
   c. means for reducing a noise component in each of the plurality of source images, such that a plurality of noise reduced images are formed corresponding to each of the plurality of source images; and
   d. means for adding the plurality of noise reduced images.

9. The apparatus as claimed in claim 8 further comprising means for receiving the digital image in a sensor and means for sending the digital image to a computer.

10. The apparatus as claimed in claim 8 further comprising means for outputting the sum of the plurality of noise reduced images to an output device.

11. The apparatus as claimed in claim 8 wherein each of the plurality of noise reduced images includes a single noise reduced image.

12. The apparatus as claimed in claim 8 wherein the predetermined number of duplicated digital images in each of the plurality of sources images is determined by $2^x$, wherein x is equal to 0 for the source image having the highest gain value, and each successive source image will have a number of duplicate digital images according to $2^{x+1}$.

13. The apparatus as claimed in claim 12 wherein a user can set the highest gain value and the number of the plurality of source images.

14. The apparatus as claimed in claim 8 wherein when the reducing means reduces the noise component in each of the plurality of source images, the computer averages each of the plurality of source images.

15. An apparatus for extending a signal range of a digital image, the apparatus comprising:
   a. a sensor configured for receiving the digital image from a subject;
   b. a computer coupled to the sensor, wherein the computer receives the digital image from the sensor and extends the signal range of the digital image;
   c. an output device coupled to the computer for receiving the digital image having the extended signal range, wherein the digital image is formed by generating a plurality of noise reduced images at gain values and performing a scaled addition of the noise reduced images based on the gain values;
   d. means for duplicating the digital image such that a plurality of source images are formed, each of the source images including a predetermined number of the duplicated digital images;
   e. means for scaling each of the plurality of source images, wherein the scaling means are based upon the gain value assigned to each of the plurality of source images, wherein the gain value for each of the plurality of source images is $2^x$, such that the highest gain value will not exceed $2^x$ where x is an integer less than or equal to 10, and each successive gain value will have a value of $2^{x-1}$;
   f. means for reducing a noise component in each of the plurality of source images, such that a plurality of noise reduced images are formed corresponding to each of the plurality of source images; and
   g. means for adding the plurality of noise reduced images.

16. The apparatus as claimed in claim 15 further comprising a sensor assembly including the sensor, a sensor cooling device and a sensor control device, the sensor assembly similarly configured to receive the digital image form the subject.

17. The apparatus as claimed in claim 15 further comprising a sensor filter and a lens coupled between the subject and the sensor configured to filter and focus the digital image before the digital image is received in the sensor.

18. The apparatus as claimed in claim 17 further comprising a transilluminator including an illumination source and a light filter, wherein the transilluminator is configured to provide illumination to the subject.

19. The apparatus as claimed in claim 18 further comprising a subject holder movably coupled to the transilluminator, the subject holder configured to move the digital image.

20. The apparatus as claimed in claim 18 further comprising a data acquisition enclosure coupled to the computer, the data acquisition enclosure including the transilluminator, the subject, the sensor filter, the lens and the sensor assembly.

21. The apparatus as claimed in claim 15 further comprising means for receiving the digital image in a sensor and means for sending the digital image to a computer.

22. The apparatus as claimed in claim 15 further comprising means for outputting the sum of the plurality of noise reduced images to an output device.

23. The apparatus as claimed in claim 15 wherein each of the plurality of noise reduced images includes a single noise reduced image.

24. The apparatus as claimed in claim 15 wherein the predetermined number of duplicated digital images in each of the plurality of sources images is determined by $2^x$, wherein x is equal to 0 for the source image having the highest gain value, and each successive source image will have a number of duplicate digital images according to $2^{x+1}$.

25. The apparatus as claimed in claim 24 wherein a user can set the highest gain value and the number of the plurality of source images.

26. The apparatus as claimed in claim 15 wherein when the reducing means reduces the noise component in each of the plurality of source images, the computer averages each of the plurality of source images.

27. The apparatus as claimed in claim 15 wherein the sensor is a charge coupled device.

28. The apparatus as claimed in claim 15 wherein the sensor is a complementary metal oxide semiconductor.

29. The apparatus as claimed in claim 15 wherein the output device is a video monitor.

30. The apparatus as claimed in claim 15 wherein the output device is a printer.

31. An article of manufacture comprising a computer readable medium bearing program code embodied therein for use with a computer, the computer program code including:
   a. means for duplicating a digital image such that a plurality of source images are formed, each of the source images including a predetermined number of the duplicated digital images;
   b. means for scaling each of the plurality of source images, wherein the scaling means is based upon a gain value assigned to each of the plurality of source images, wherein the gain value for each of the plurality of source images is $2^x$, such that the highest gain value will not exceed $2^x$ where x is an integer less than or equal to 10, and each successive gain value will have a value of $2^{x-1}$;
   c. means for reducing a noise component in each of the plurality of source images, such that a plurality of noise reduced images are formed corresponding to each of the plurality of source images; and
   d. means for adding the plurality of noise reduced images.

32. The article of manufacture as claimed in claim 31 further comprising means for receiving the digital image in a sensor and means for sending the digital image to a computer.

33. The article of manufacture as claimed in claim 31 further comprising means for outputting the sum of the plurality of noise reduced images to an output device.

34. The article of manufacture as claimed in claim 31 wherein each of the plurality of noise reduced images includes a single noise reduced image.

35. The article of manufacture as claimed in claim 31 wherein the predetermined number of duplicated digital images in each of the plurality of sources images is determined by $2^x$, wherein x is equal to 0 for the source image having the highest gain value, and each successive source image will have a number of duplicate digital images according to $2^{x+1}$.

36. The article of manufacture as claimed in claim 35 wherein a user can set the highest gain value and the number of the plurality of source images.

37. The article of manufacture as claimed in claim 31 wherein when the reducing means reduces the noise component in each of the plurality of source images, the computer averages each of the plurality of source images.

38. An apparatus for extending a signal range of a digital image, the apparatus comprising:
   a. a storage media for storing a computer application;
   b. a processing unit coupled to the storage media; and
   c. a user interface coupled to the processing unit such that a user can duplicate the digital image to form a plurality of source images at preselected gain values, reduce a noise component in each of the plurality of source images to form a plurality of noise reduced images and add the plurality of noise reduced images in a scaled addition process that scales the plurality of noise reduced images according to the preselected gain values wherein the preselected gain values for the plurality of source images is $2^x$, such that the highest gain value will not exceed $2^x$ where x is an integer less than or equal to 10, and successive preselected gain values have a value of $2^{x-1}$.

39. A method of extending a signal range of a digital image, the method comprising:
   a. collecting a plurality of source images at a plurality of preselected gain values;
   b. subjecting the groups of the plurality of source images to a noise reduction process that have the same preselected gain values to produce a plurality of corresponding noise reduced images;
   c. combining the plurality of noise reduced images in a scaled addition using a normalized gain function based on the preselected gain values corresponding to each of the noise reduced images to form a plurality of scaled noise reduce images and adding the plurality of scaled noise reduced images to produce a Super O.D. image.

40. A method of forming a Super O.D. image, the method comprising:
   a. acquiring a plurality of digital source images at a range of gain values;
   b. performing a noise reduction on groups of the plurality digital source images acquired at the same gain values to form a corresponding plurality noise reduced digital images;
   c. scaling the each of the plurality of noise reduced digital images based their respective gain values to form a plurality of scaled noise reduced digital images; and
   d. adding the scaled noise reduced digital images to form the Super O.D. image.

* * * * *

UNITED STATES PATENT AND TRADEMARK OFFICE
CERTIFICATE OF CORRECTION

PATENT NO.    : 6,909,459 B2
DATED         : June 21, 2005
INVENTOR(S)   : Robert M. Watson Jr. et al.

It is certified that error appears in the above-identified patent and that said Letters Patent is hereby corrected as shown below:

Title page,
Item [56], References Cited, FOREIGN PATENT DOCUMENTS, replace "JP      920196 A2" with -- EP      0 920 196 A2 --.

Column 5,
Line 6, replace "gain value Will" with -- gain value will --.

Column 6,
Line 49, replace "computational,operations" with -- computational operations --.

Column 8,
Line 36, replace "process of resealing" with -- process or rescaling --.

Column 11,
Line 49, replace "DRIF was, set" with -- DRIF was set --.
Line 50, replace "1000-fold resealing" with -- 1000-fold rescaling --.

Column 15,
Line 9, replace "practitioner the resealing" with -- practitioner that rescaling --.

Column 16,
Line 20, replace "the output resealing" with -- the output rescaling --.
Line 33, replace "resealing and truncation" with -- rescaling and truncation --.

Signed and Sealed this

Twenty-seventh Day of September, 2005

JON W. DUDAS
*Director of the United States Patent and Trademark Office*